(12) United States Patent
Morgenstern et al.

(10) Patent No.: US 12,314,605 B2
(45) Date of Patent: May 27, 2025

(54) DYNAMIC MEMORY AREA CONFIGURATION FOR BUILDING PAGE FRAME TABLE ENTRIES

(71) Applicant: INTERNATIONAL BUSINESS MACHINES CORPORATION, Armonk, NY (US)

(72) Inventors: Harris M. Morgenstern, Wappingers Falls, NY (US); David Hom, Poughkeepsie, NY (US); Robert Miller, Jr., Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 18/182,095

(22) Filed: Mar. 10, 2023

(65) Prior Publication Data
US 2024/0302995 A1   Sep. 12, 2024

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
USPC ........................................................ 711/154
See application file for complete search history.

(56) References Cited

U.S. PATENT DOCUMENTS

| | | |
|---|---|---|
| 5,765,210 A | 6/1998 | Greenstein et al. |
| 6,205,528 B1 | 3/2001 | Kingsbury et al. |
| 8,321,638 B2 | 11/2012 | Riel et al. |
| 9,164,915 B2 | 10/2015 | Foster et al. |
| 9,280,458 B2 | 3/2016 | Durrant |
| 9,483,394 B1* | 11/2016 | Morgenstern ....... G06F 12/1036 |
| 9,658,792 B2 | 5/2017 | Morgenstern et al. |
| 9,977,747 B2 | 5/2018 | Baskakov et al. |
| 10,942,683 B2 | 3/2021 | Hom et al. |
| 2002/0120827 A1 | 8/2002 | Morgenstern et al. |

(Continued)

OTHER PUBLICATIONS

International Searching Authority, "Notification of Transmittal of the International Search Report and the Written Opinion of the International Searching Authority, or Declaration, " Patent Corporation Treaty, May 10, 2024, 12 pages, International Application No. PCT/EP2024/055401.

*Primary Examiner* — Mardochee Chery
(74) *Attorney, Agent, or Firm* — Randy Emilio Tejeda (57) ABSTRACT

Dynamic memory area configuration includes designating a portion of memory as a specialized memory unit, and reserving a first portion of specialized memory unit for a plurality of page frame table entries (PFTEs) representing a plurality of frames in the specialized memory. One or more of the PFTEs are stored in respective queue entries within a queue in a reserved area of the specialized memory unit. A particular queue entry indicates that a particular PFTE associated with a particular frame is available for use. An offline request to take a second portion of the specialized memory unit offline is received. Whether to fulfill the offline request is determined based on whether the second portion of the specialized memory unit has an associated queue entry within the queue indicating that the associated frame is not in use back a portion of a page frame table (PFT) or the specialized memory unit.

17 Claims, 9 Drawing Sheets

(56) References Cited

U.S. PATENT DOCUMENTS

| | | | |
|---|---|---|---|
| 2008/0077764 A1* | 3/2008 | Pierce | G06F 12/123 |
| | | | 711/E12.072 |
| 2012/0290765 A1 | 11/2012 | Durrant | |
| 2013/0145073 A1 | 6/2013 | Tuch et al. | |
| 2014/0075142 A1 | 3/2014 | Hom et al. | |
| 2014/0201496 A1 | 7/2014 | Foster et al. | |
| 2016/0364339 A1 | 12/2016 | Morgenstern et al. | |
| 2021/0034545 A1* | 2/2021 | Palmer | G06F 12/0846 |

* cited by examiner

FIG. 1

| Real address of frame the frame corresponding to the PFTE backs in the PFT space 202 | PFT Space – PFTVSA64 indicates the virtual address in the PFT Space that the frame backs 204 | PFT virtual addresses (corresponding real address) 206 |
|---|---|---|
| 1_80000000x<br>1_00000000x | PFTVSA64 =6000000x<br>PFTVSA64 =4000000x | 2040040x (81001000x)<br>2040000x (81000000x) |
| 81000000x | PFTVSA64 =2040000x | 2001000x (08004000x) |
| 80001000x<br>80000000x | ...<br>PFTVSA64 = 2001000x<br>PFTVSA64 = 2000000x | 2000040x (80001000x)<br>2000000x (80000000x) |

DYNAMIC MEMORY AREA CONFIGURATION FOR BUILDING PAGE FRAME TABLE ENTRIES

BACKGROUND

Field of the Disclosure

The field of the disclosure is data processing, or, more specifically, methods, apparatus, and products for dynamic memory area configuration for building page frame table entries.

Description of Related Art

A computer operating system manages its main memory as well as virtual memory. Virtual memory pages are assigned to applications and backed by (i.e., stored in) main memory frames when used. However, portions of main memory are used to back a range of virtual memory that keeps track of the main memory. This range of virtual memory contains page frame table entries (PFTEs). During system initialization, frames are needed to back PFTEs used to represent main memory. Example of such frames are 2 GB storage frames in the large frame area (LFAREA), a portion of main memory. The needed frames are obtained from an area of main memory that is initialized to support other early initialization processes. When the LFAREA is specified to be large, this area for early frames becomes exhausted as the frames needed to back the PFTEs are taken. This causes system initialization to fail.

Some systems use a technique of backing the PFTEs in the same address increment that contains the storage the PFTEs represent. This technique, referred to herein as the zone technique, is performed by using the first (i.e., lowest address) 4 KB frame in the address increment to back the first page of PFTEs that represent the backing frame itself, and then working upward by adding more PFTEs to represent each of the succeeding 4 KB frames.

SUMMARY

Exemplary embodiments include a method, apparatus, and computer program product to dynamic memory area configuration for building page frame table entries. An embodiment of a method for dynamic memory area configuration includes designating a portion of memory as a specialized memory unit, and reserving a first portion of specialized memory unit for a plurality of page frame table entries (PFTEs), the PFTEs representing a plurality of frames in the specialized memory unit. The method further includes storing one or more of PFTEs in respective queue entries within a queue in a reserved area of the specialized memory unit, a particular queue entry indicating that a particular PFTE associated with a particular frame is available for use. The method further includes receiving an offline request to take a second portion of the specialized memory unit offline. The method further includes determining whether to fulfill the offline request based on whether the second portion of the specialized memory has an associated queue entry within the queue indicating that the associated frame is not in use backing a portion of a page frame table (PFT) for the specialized memory unit.

An embodiment of an apparatus for dynamic memory area configuration includes a computer processor; and a computer memory operatively coupled to the computer processor, the computer memory having disposed within it computer program instructions that, when executed by the computer processor, cause the apparatus to: designate a portion of memory as a specialized memory unit; reserve a first portion of specialized memory unit for a plurality of page frame table entries (PFTEs), the PFTEs representing a plurality of frames in the specialized memory unit; store one or more of PFTEs in respective queue entries within a queue in a reserved area of the specialized memory unit, a particular queue entry indicating that a particular PFTE associated with a particular frame is available for use; receive an offline request to take a second portion of the specialized memory offline; and determine whether to fulfill the offline request based on whether the second portion of the specialized memory unit has an associated queue entry within the queue indicating that the associated frame is not in use backing a portion of a page frame table (PFT) for the specialized memory unit.

An embodiment of a computer program product for dynamic memory area configuration, the computer program product disposed upon a computer readable medium, the computer program product comprising computer program instructions that, when executed, cause a computer to: designate a portion of memory as a specialized memory unit; reserve a first portion of specialized memory unit for a plurality of page frame table entries (PFTEs), the PFTEs representing a plurality of frames in the specialized memory unit; store one or more of PFTEs in respective queue entries within a queue in a reserved area of the specialized memory unit, a particular queue entry indicating that a particular PFTE associated with a particular frame is available for use; receive an offline request to take a second portion of the specialized memory unit offline; and determine whether to fulfill the offline request based on whether the second portion of the specialized memory has an associated queue entry within the queue indicating that the associated frame is not in use backing a portion of a page frame table (PFT) for the specialized memory unit.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Various embodiments of the present disclosure provide for dynamic memory area configuration for building page frame table entries. A page frame table entry (PFTE) is used to describe the attributes of a particular real frame. Such attributes may include the address space whose virtual memory it backs as well as the virtual address it backs. A Reserved PFTE Area (RPA) is used to back up an area of PFTEs. A specialized memory refers to a unit of real storage that can be configured offline/online and does not require other memory to represent itself. A plurality of specialized memory units may exist, each having distinct purposes. Non-specialized memory refers to the remaining portion of real storage. In some computer architectures, memory can be configured offline on one logical partition (LPAR) and configured online on another LPAR within a system complex. A value of this feature is system availability, namely that memory can be moved from one LPAR to another without having to shut down the affected systems. The smallest unit of memory that can be reconfigured is referred to herein as a storage increment. In an example, an increment is a hardware defined power of 2 range of 4K real frames. The operating system provides system commands to configure memory offline one LPAR and online on another. The commands can indicate either an amount of memory to take offline or specific ranges of real memory encompassing one or more storage increments. At a lower level, the actual management of real memory is performed on PFTEs. In an example, there is one such PFTE per 4K unit of memory and collectively the entire table is referred to as a Page Frame Table (PFT).

Creation of the PFT requires the use of a bootstrap process of modifying memory which is not yet initialized to represent itself. One manner of doing so uses memory from the storage increment to back the PFTEs that represent memory from the same increment. This method is advantageous for two reasons: (1) memory being initiated does not require any other memory that has already been initialized; and (2) when an increment is configured offline, the memory representing the PFT area associated with the increment can be freed and taken offline.

However, this strategy has a key disadvantage in that it limits the manner in which a storage increment can be used. For example, if the storage increment is 2G in size, and some frames in the increment are used to back the PFT space for the increment, then there can be no 2G frames formed from the increment. A resolution to this problem is described in U.S. Pat. No. 9,658,792 B2 incorporated herein by reference. U.S. Pat. No. 9,658,792 B2 describes a procedure for reserving a storage area and building PFTEs where an RPA is created at the very top of main storage to represent the PFT for other storage. The aforementioned problem is solved by designating a single increment or multiple increments as the source of frames to back the PFTE space for other increments. Thus, the ability to create 2G frames in other increments is preserved. The procedure described by U.S. Pat. No. 9,658,792 B2 is static, meaning that it does not handle memory being reconfigured online or offline after the system is initialized. Moreover, the RPA area in the PFT space described in U.S. Pat. No. 9,658,792 B2 does not provide for offline configuration.

Various embodiments described herein extend upon principles described in U.S. Pat. No. 9,658,792 B2 to allow memory areas to be created dynamically when additional memory is configured online. When all of the memory that the RPA represents is configured offline, the storage increment containing the RPA becomes eligible to be configured offline assuming that none of the other memory in the increment is in use by a job. When an operator attempts to configure offline several increments of memory including a memory containing an RPA, the operating system may attempt to configure the increments not containing the RPA first to potentially allow the increment containing the RPA to become eligible to be configured offline. If the RPA cannot be taken offline, the entire reconfiguration request is backed out. If the operator specifies a specific amount of memory to be configured offline, the system automatically locates memory increments that are immediately eligible to be taken offline, which may subsequently free any RPA frames that are used to back the PFT space representing such increments. If additional memory needs to be configured offline to satisfy the request, increments containing freed RPA frames may subsequently become reconfigurable.

Figure 1:
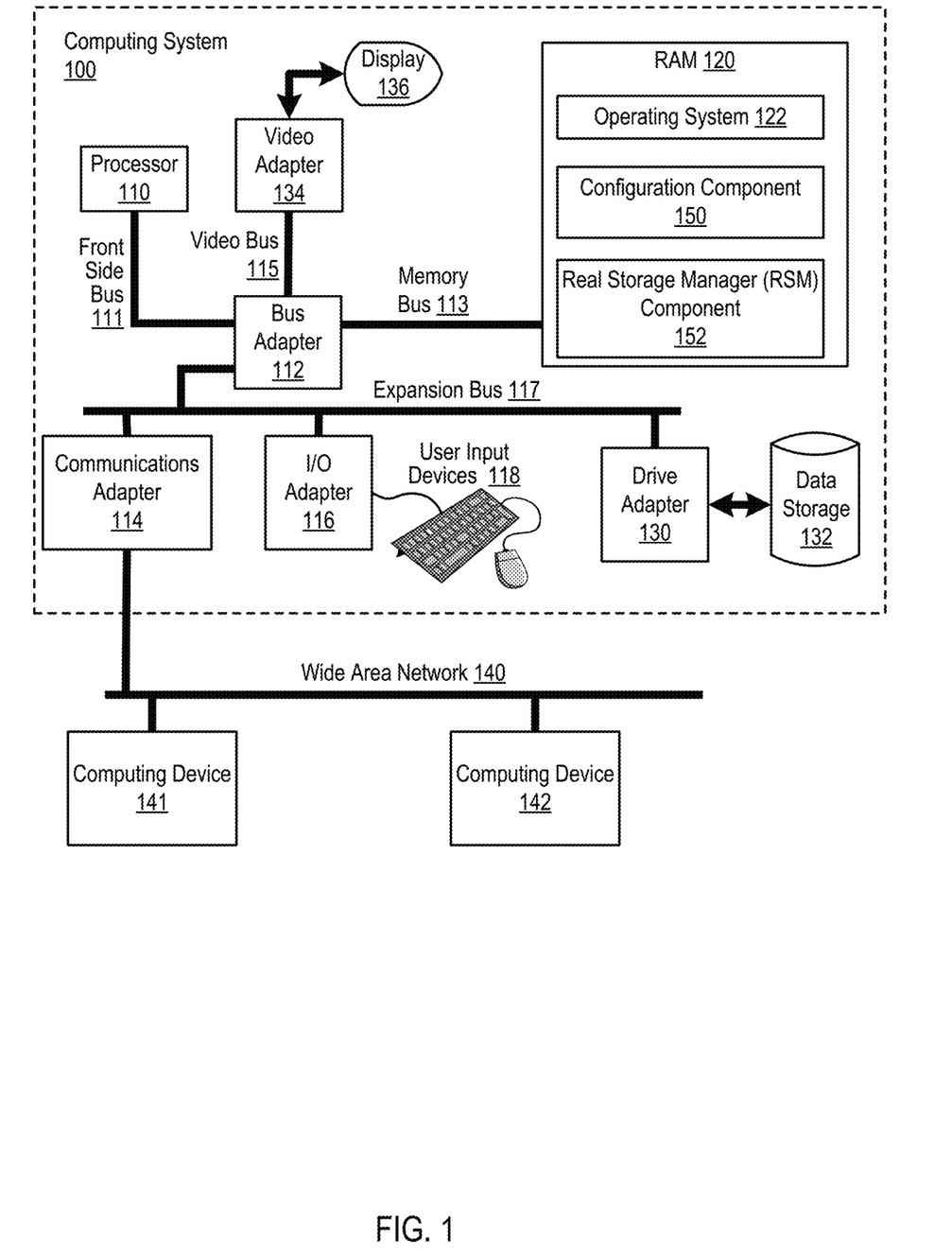
FIG. 1 shows a block diagram of an example computing system configured for dynamic memory area configuration for building page frame table entries according to some embodiments of the present disclosure.

Exemplary apparatus and systems for dynamic memory area configuration for building page frame table entries in accordance with the present disclosure are described with reference to the accompanying drawings, beginning with FIG. 1. FIG. 1 sets forth a block diagram of automated computing machinery comprising an exemplary computing system 100 configured for dynamic memory area configuration for building page frame table entries in accordance with embodiments of the present disclosure. The computing system 100 of FIG. 1 includes at least one computer processor 110 or 'CPU' as well as random access memory ('RAM') 120 which is connected through a high speed memory bus 113 and bus adapter 112 to processor 110 and to other components of the computing system 100.

Stored in RAM 120 is an operating system 122. Operating systems useful in computers configured for performing dynamic memory area configuration for building page frame table entries according to embodiments of the present disclosure include UNIX™, Linux™, Microsoft Windows™, AIX™, and others as will occur to those of skill in the art. The operating system 122 in the example of FIG. 1 is shown in RAM 120, but many components of such software typically are stored in non-volatile memory also, such as, for example, on data storage 132, such as a disk drive. Also stored in RAM is a configuration component 150 and real storage manager (RSM) component 152 configured to perform dynamic memory area configuration for building page frame table entries in accordance with embodiments of the present disclosure. The configuration component 150 is configured to process storage online or offline requests, and identify which storage increments are eligible for/associated with the request. Once identified, the configuration component is configured to call the RSM component 152 to take the real storage offline. The RSM component 152 is configured to keep track of the contents of real storage. The RSM component 152 takes a storage increment provided by the configuration component 152 and marks the PFTEs associated with the storage increment as either online or offline. As pages of the PFTE are marked online, the pages of PFTEs are backed with the RPA PFTE in an RPA queue. RPA PFTEs are used to back the PFTEs that represent the increments of specialized memory as they are coming up online on a configuration request.

The computing system 100 of FIG. 1 includes disk drive adapter 130 coupled through expansion bus 117 and bus adapter 112 to processor 110 and other components of the computing system 100. Disk drive adapter 130 connects non-volatile data storage to the computing system 100 in the form of data storage 132. Disk drive adapters useful in computers configured for inserting sequence numbers into editable tables according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system 100 of FIG. 1 includes one or more input/output ('I/O') adapters 116. I/O adapters implement user-oriented input/output through, for example, software drivers and computer hardware for controlling output to display devices such as computer display screens, as well as user input from user input devices 118 such as keyboards and mice. The example computing system 100 of FIG. 1 includes a video adapter 134, which is an example of an I/O adapter specially designed for graphic output to a display device 136 such as a display screen or computer monitor. Video adapter 134 is connected to processor 110 through a high speed video bus 115, bus adapter 112, and the front side bus 111, which is also a high speed bus.

The exemplary computing system 100 of FIG. 1 includes a communications adapter 114 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for inserting sequence numbers into editable tables according to embodiments of the present disclosure include modems for wired dial-up communications, Ethernet (IEEE 802.3) adapters for wired data communications, and 802.11 adapters for wireless data communications. The communications adapter 114 of FIG. 1 is communicatively coupled to a wide area network 140 that also includes other computing devices, such as computing devices 141 and 142 as shown in FIG. 1.

U.S. Pat. No. 9,658,792 B2 describes defining 2G continuous areas of frames that are used to back the PFT space. The PFTEs associated with such frames are not queued, but rather are managed by an associated control structure which keeps track of the next available frame. If the memory is never the subject of a reconfiguration request, the procedure described by U.S. Pat. No. 9,658,792 B2 works well. As more memory is initialized, additional memory RPAs may be designated to create additional pools of frames for backing the PFT space. As soon as memory reconfiguration is introduced, some of the memory backing the RPA will become free. However, the methodology described in U.S. Pat. No. 9,658,792 B2 does not contemplate tracking this storage.

Various embodiments describe herein provide for introduction of a queue of available RPA PFTEs. The RPA control structure for an RPA 2G area will continue to track the RPA memory. When a specialized RPA area is created, the resulting PFTEs that represent available frames are added to a specialized RPA PFTE queue to indicate that the frames are available for use. Additionally, when a PFTE from the RPA is used, a field PFTVSA64 is primed with the address within the PTF space that the corresponding 4K frame is backing to track dependency relationships between frames in the PFT space.

When memory is brought online during either system initialization or via a system command (e.g., a MVS CONFIG system command), the system determines whether there are any PFTEs available on the RPA frame queue. If so, the corresponding frames are used to back the PFT space as needed. At this time, the field PFTVSA64 is primed with the address in the PFT space that the frame is backing. Additionally, when DAT tables are needed to virtually map the PFT space, a frame from the RPA available frame queue may be used. In this case, PFTVSA64 is primed with the first address of the segment being mapped by the page table. If the available RPA frame queue runs low, the system designates an area within the current storage increment being initialized to be used as an RPA and populates the RPA PFTE queue with frames form the increment that is currently being initialized.

Memory can only be configured offline when it is not in use, meaning the memory is (1) not assigned to a job, and (2) not being used to back the PFT space other than its own increment. With regard to (2), this means that a memory increment cannot be taken offline until all the increments it backs in the PFT space are taken offline (other than itself). For example, assume that some frames from increment 1 are being used to back the PFT space associated with increment 2. If the operator were to attempt to configure increment 1 offline by itself, the request would necessarily fail because increment 2 depends on frames from increment 1. Increment 2 must be taken offline before increment 1 is taken offline. More generally, if there are other increments whose PFT range is backed by frames from increment 1, all such increments must be configured offline in order to free increment 1's frames so that it can be taken offline. This gives rise to a partial ordering of the increments based on which increment's frames back the PFT space of other increments. Such dependencies cannot be circular because storage increments come online in a specific order. In other words, if increment 1 comes online (at initialization or through reconfiguration) prior to increment 2, then the PFT space for increment 2 could be backed by frames from increment 1, but not conversely.

Figure 2:
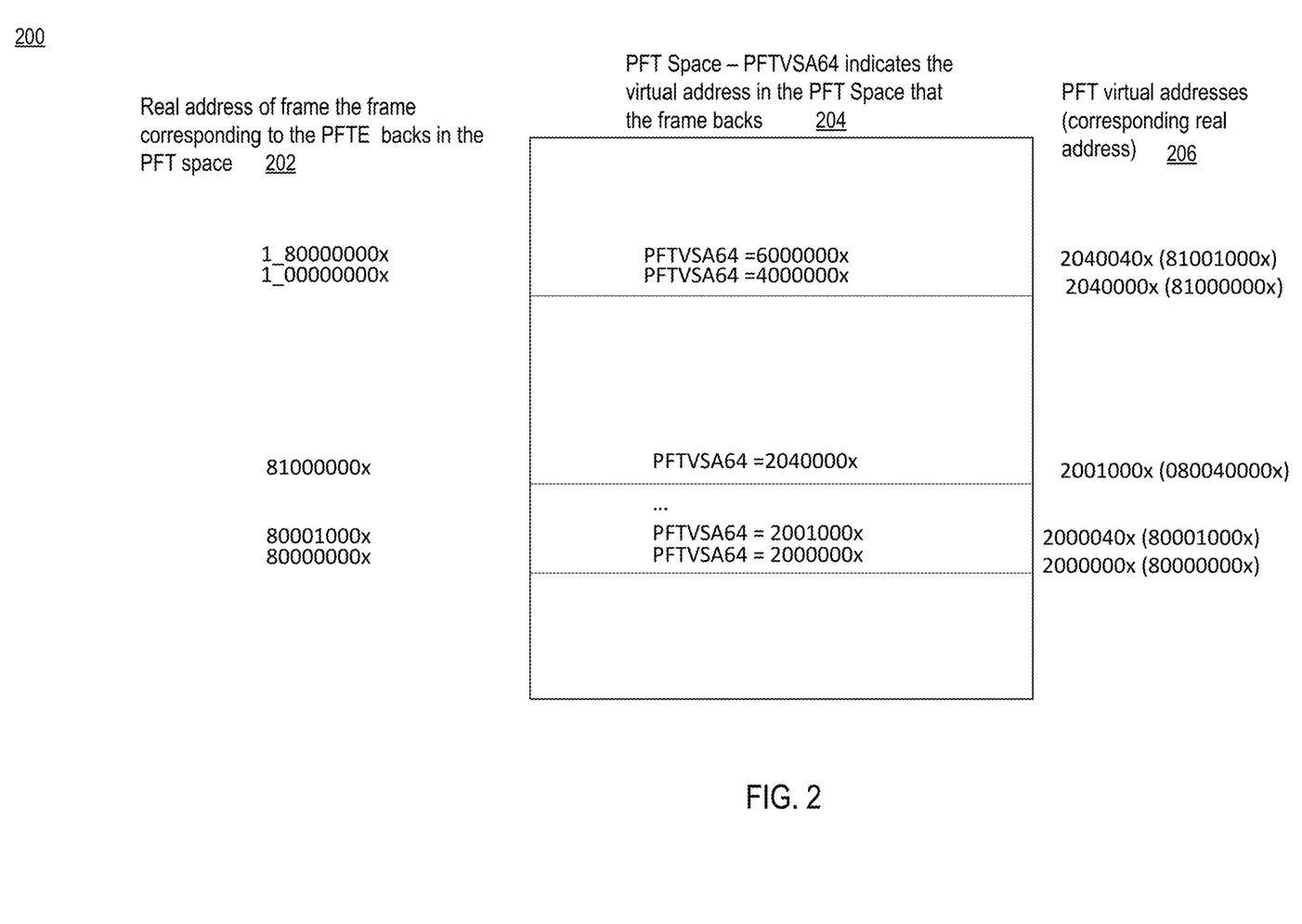
FIG. 2 shows an example configuration of a PFT space according to some embodiments of the present disclosure.

FIG. 2 shows an example configuration 200 of a PFT space 204 according to some embodiments of the present disclosure. The example layout of the PFT space 204 shows a real address 202 of the frame corresponding to the PFTE and a PFT virtual address 206 corresponding to the real address. Assuming 2G increment size, each PFTE is of 40x bytes in size, and the real address of a frame is (PFTE address)/40x*1000x. The PFTE at address 2040000x backs a page of PFTEs that are associated with the next higher increment. The PFTE at address 6000000x is backed by the frame associated with the PFTE at 20400000x. The PFTE at 6000000x is backed by the frame associated with the PFTE at 20400040x. Assuming each PFTE represents a 4K real frame then the storage increment starting at 1_00000000x must be configured offline before the increment starting at 80000000x. A similar dependency exists for the increment starting at 1_80000000x.

Figure 3:
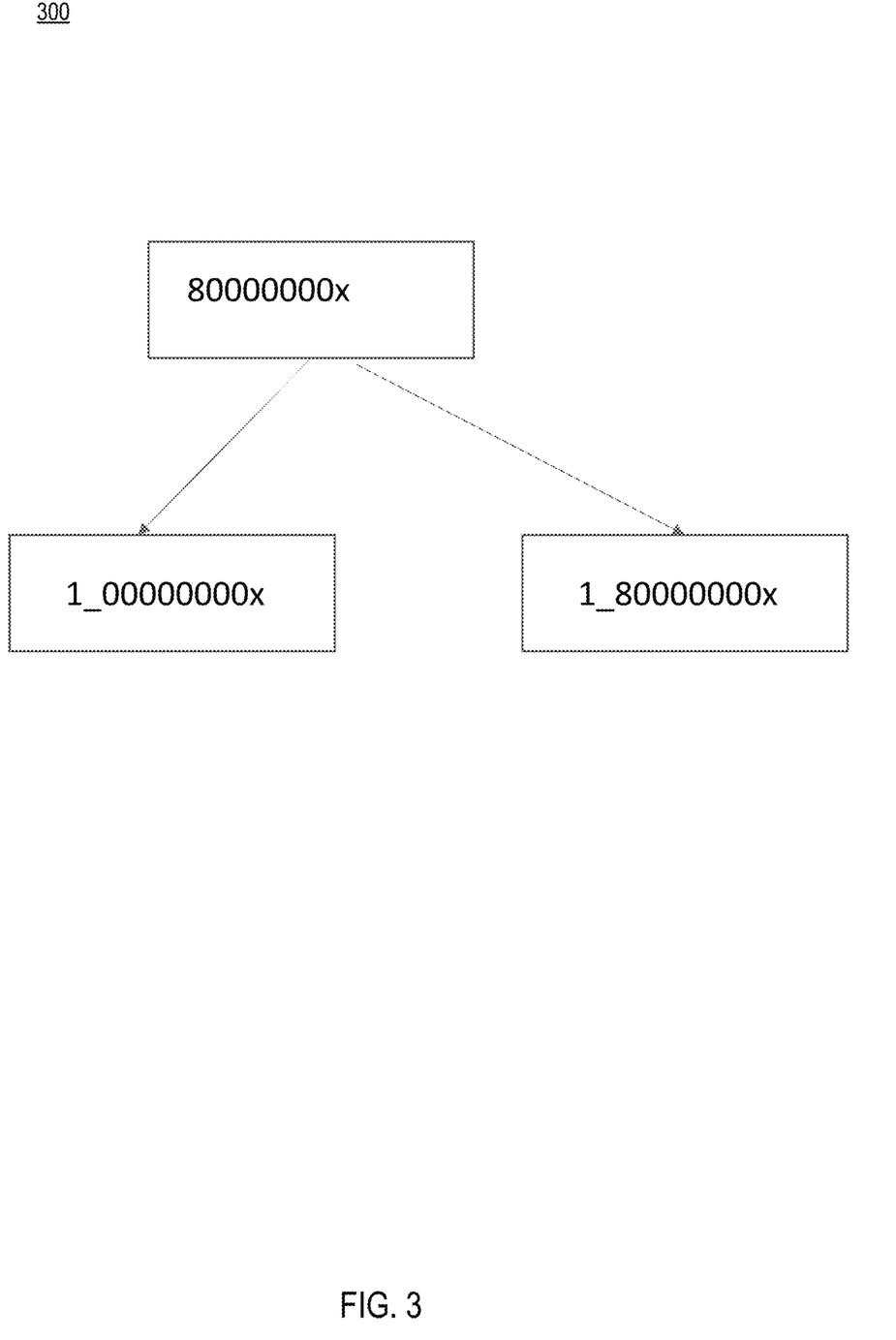
FIG. 3 shows an example of dependency between increments for the PFT space of FIG. 2 according to some embodiments of the present disclosure.

FIG. 3 shows an example of dependency 300 between increments for the PFT space 204 of FIG. 2 according to some embodiments of the present disclosure. FIG. 3 illustrates storage increments for a directed acyclic graph with regard to reconfiguration dependencies. The PFT Space for the increments starting at real addresses 1_00000000x and 1_80000000x depend on frames from the increment starting at 80000000x for their virtual mapping. The increment starting at real address 80000000x cannot be configured offline until the increments that depend on it are configured offline.

Referring again to FIG. 1, in systems such as multiple virtual storage (MVS), specialized memory reconfiguration typically occurs by way of a CONFIG system command. Memory can be taken offline if it is not in use (e.g., assigned to a job). If the memory is assigned to a job, the command waits for the memory to be returned to the system and provides the operator with the choice of either cancelling the jobs that own the memory or cancelling the reconfiguration request. The operator also has a choice of specifying either a contiguous range of increments or some amount of storage equal to some integral multiple of increments. The strategies for handling each case is different. For configuration by range according to an embodiment, the system determines whether memory that is not part of the request has a dependency on memory that is part of the request. In other words, the system determines if there is some increment that is part of the request whose frames are backing the PFT space for an increment that is not part of the request. If this is the case, the request fails.

For configuration by amount according to an embodiment, the reconfiguration processor selects the increments to configure offline based on the following criteria:

(1) Increment memory not backing the PFT space associated with a different increment.
(2) Increment memory not in use by a job.

After processing increments that meet both criteria first, it is possible that some increments that previously did not meet criteria (1) now do. Thus, after an increment is logically taken offline, the processing reassess the status of all increments. If there are no increments that meet both criteria, increments that meet criteria (1) are selected and the operator must either cancel the reconfiguration request or cancel the jobs that are preventing it from completing.

Figure 4:
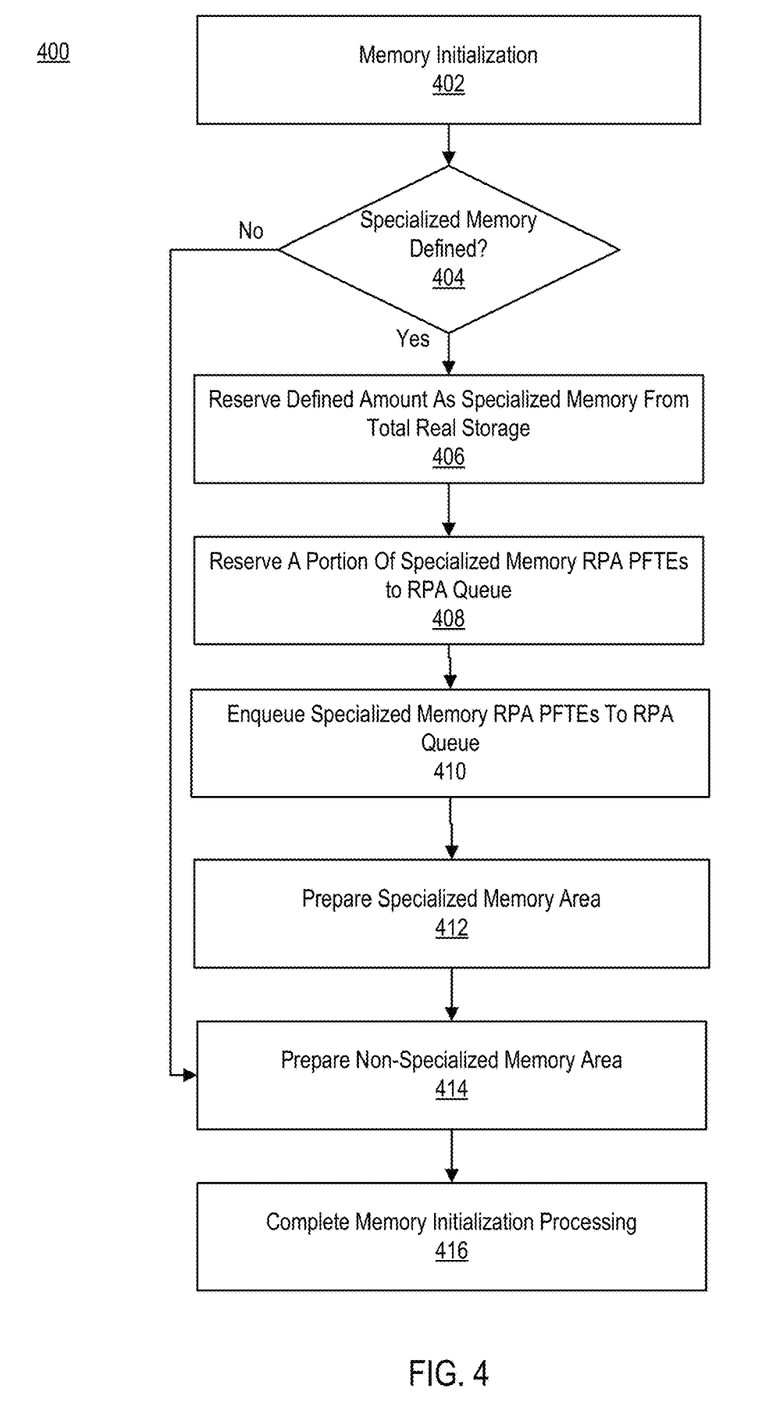
FIG. 4 is a flowchart of an example method for specialized memory Reserved PFTE Area (RPA) queue creation according to some embodiments of the present disclosure.

FIG. 4 is a flowchart of an example method 400 for specialized memory RPA queue creation according to some embodiments of the present disclosure. The specialized memory RPA queue stores PFTEs that represent frames that are available for use. In the method 400 of FIG. 4, the computer system 100 performs memory initialization 402 at a time of system initial program load (IPL) to designate some real storage into specialized units. The computer system 100 checks 404 to see if a specialized memory unit is defined.

If specialized memory unit is defined, the computer system 100 reserves 406 a defined amount of total real storage as specialized memory. The computer system 100 further reserves 408 a portion of the specialized memory as specialized memory RPA PFTEs including the RPA queue. The computer system 100 further enqueues 410 the specialized memory RPA PFTEs to the RPA queue which makes them available for use when storage increments are brought online. The computer system 100 further prepares 412 the specialized memory area by designating the remaining portion of the specialized memory as specialized memory to only be used by intended applications that can use specialized memory. The computer system 100 prepares 414 the non-specialized memory area by designating the remaining portion of real storage as non-specialized memory to be used by all applications. The computer system 100 then completes 416 memory initialization processing.

If specialized memory is not defined, the computer system 100 proceeds to prepare 414 the non-specialized memory area by designating the remaining portion of real storage as non-specialized memory to be used by all applications, and completing 416 memory initialization processing.

FIGS. 5-8 include flowcharts illustrating various interactions between the configuration component 150 and the RSM component 152 according to some embodiments of the present disclosure. The configuration component 150 is configured to process storage online and offline requests and identify which storage increments are eligible for/associated with the request. Once identified, the configuration component 150 calls the RSM component 152 to take the real storage offline. The RSM component 152 is configured to keep track of the contents of real storage. The RSM component 152 takes the storage increment provided by the configuration component 150 and marks the PFTEs associated with the storage increment online or offline. As pages of PFTEs are marked online/offline, these pages of PFTEs are backed/not backed with the RPA PFTE.

Figure 5:
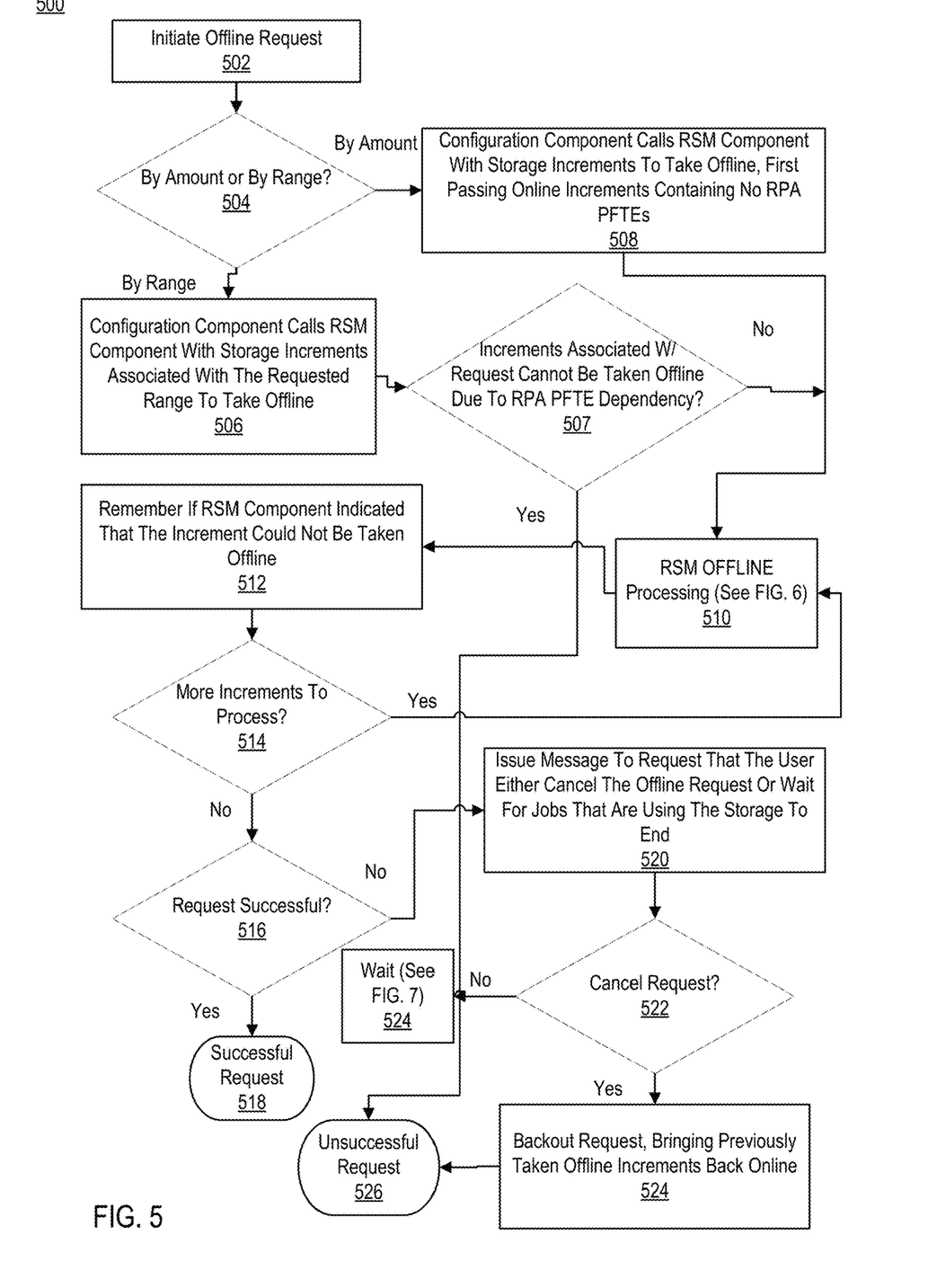
FIG. 5 is a flowchart of an example method for storage configuration offline processing performed by a configuration component according to some embodiments of the present disclosure.

FIG. 5 is a flowchart of an example method 500 for storage configuration offline processing performed by the configuration component 150 according to some embodiments of the present disclosure. In the method 500 of FIG. 5, an offline request is initiated 502 by a system command such as a CONFIG STOR OFFLINE system command. Requests can be by storage range or by storage amount. The configuration component 150 receives the request and determines 504 whether the request is by amount or by range. If the request is by range, the configuration component obtains control to process the OFFLINE request by range and calls the RSM component 152 with storage increments associated with the requested range to take offline. Before, the configuration component 150 calls 506 the RSM component 152 for RSM offline processing 510 for each increment associated with the range as further discussed with respect to FIG. 6, the configuration component 150 checks 507 if there are increments associated with the request that cannot be taken offline due to RPA PFTE dependency. If yes, the request is failed as an unsuccessful request 526. If no, the method 500 proceeds to RSM offline processing 510.

If the request is by amount, the configuration component 150 obtains control to process the offline request by amount. The configuration component 150 calls 508 the RSM component 152 for RSM offline processing 510 with enough eligible online increments to satisfy the amount requested as further discussed with respect to FIG. 6. The configuration component 150 chooses storage increments that do not contain RPA PFTEs first for RSM component 152 to take offline because these increments are more likely to be successfully taken offline. In addition, if the amount requested is such that increments with RPA PFTEs are needed to satisfy the request, the likelihood of successfully taking them offline is increased as most of those increments that these RPA PFTEs back are already offline.

On return from RSM offline processing 510, the configuration component 150 remembers 512 if the RSM component indicated that the increment could not be taken offline. The configuration component 150 checks 514 to see if there are more increments to process. If there are more increments to process, the configuration component 150 calls RSM offline processing 510 again for the other increments associated with the request. If there are no more increments to process, the configuration component 150 determines 516 if the offline request was successful. If the request was successful, the configuration component 150 indicates a successful request 518. In a particular embodiment, the configuration component 150 determines that the request was successful by receiving an indication from the RSM component 152 that the increments were taken offline.

If the request was not successful, the configuration component 150 issues 520 a message to a user indicating that the request is waiting because some storage within the offline request is still in use. The message allows the user to wait for the job(s) using the storage to end or to cancel the offline request if the user cannot wait for the job(s) to end. In particular embodiments, the configuration component 150 determines that the request was not successful by receiving an indication from the RSM component 152 that at least one increment was not taken offline.

The configuration component 150 determines 522 whether the user cancelled the request. If the user did not cancel the request the configuration component 150 waits 524 for RSM intercept processing as further discussed with respect to FIG. 7. RSM intercept processing obtains control as storage is returned to the system (e.g., when all the in-use storage associated with the offline request is freed). RSM intercept processing takes the increment offline, enabling the configuration component 150 to remove the prompt message and complete the offline request.

If the user cancelled the offline request, the configuration component 150 backs out the request which may entail bringing back increments of storage previously taken offline back online. In a particular embodiment, the configuration component 150 brings back increments that had RPA PFTEs back online first. It should be noted that online processing requires the use of RPA PFTEs. To avoid a circular condition, in which increment A contains RPA PFTEs that back increment B and vice-versa, increments that had RPA PFTEs will be brought back online before increments that had no RPA PFTEs. This processing prevents circular dependencies among increments. Processing will end and indicate 526 that the offline request was unsuccessful.

Figure 6:
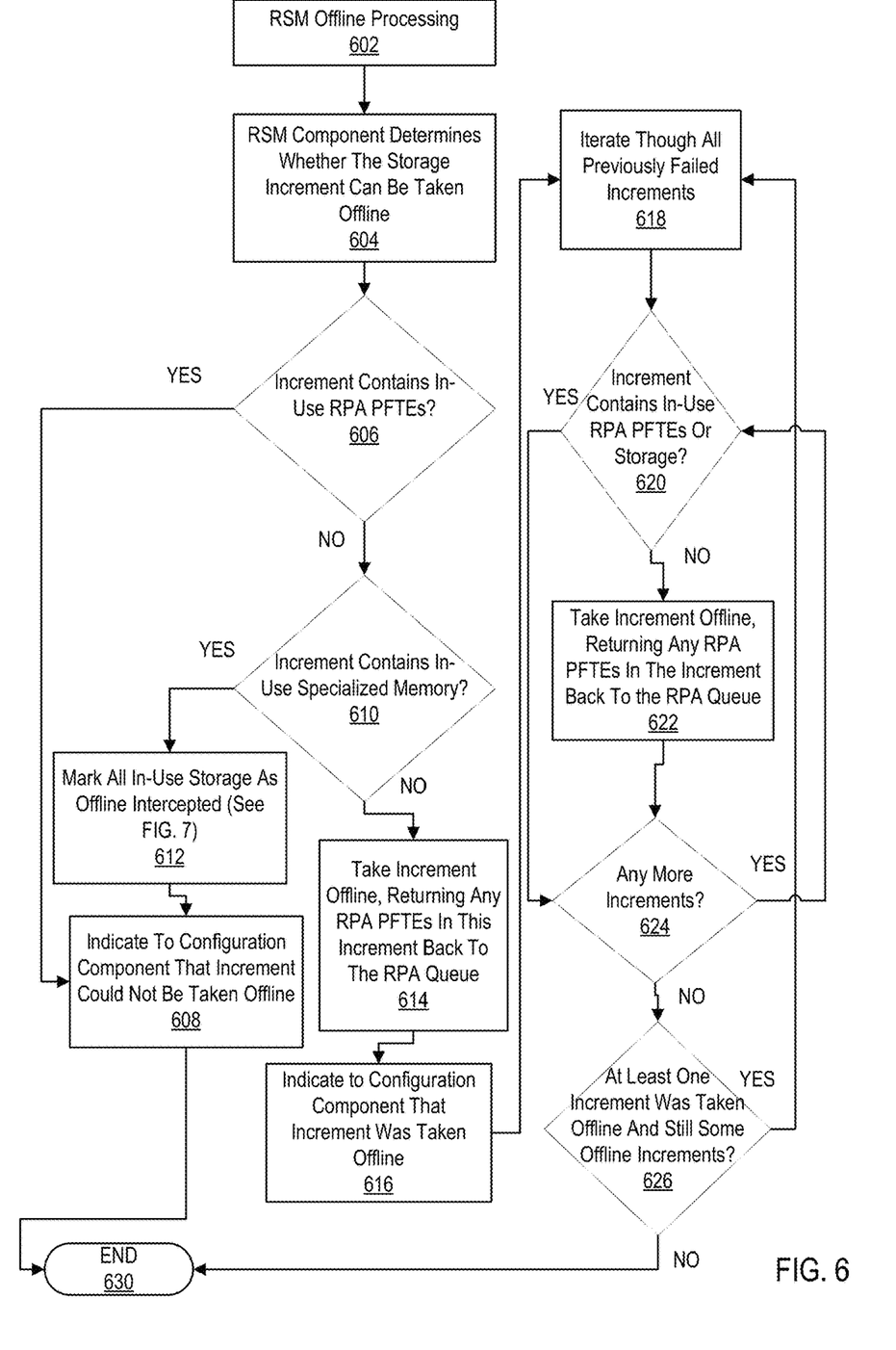
FIG. 6 is a flowchart of an example method for storage configuration offline processing performed by a real storage manager (RSM) component according to some embodiments of the present disclosure.

FIG. 6 is a flowchart of an example method 600 for storage configuration offline processing performed by the RSM component 152 according to some embodiments of the present disclosure. In the method 600 of FIG. 6, RSM OFFLINE processing 602 is called by the configuration component 150 for each increment that is to be taken offline. The RSM component 152 determines 604 whether the storage increment can be taken offline by interrogating the PFTEs that make up the increment to determine if the increment is eligible to be taken offline. The RSM component 152 determines 606 if an increment is ineligible to be taken offline if there are any in-use RPA PFTEs in the increment by checking if the increment contains RPA PFTEs that are in-use.

If the increment contains in-use RPA PFTEs, the RSM component 152 indicates (608) to the configuration component 150 that the increment could not be taken offline before ending RSM OFFLINE processing 630 in which processing returns to the configuration component 150. If the increment does not have any in-use RPA PFTEs, the RSM component 152 determines 610 if the increment has any in-use specialized memory storage.

If the increment has any in-use specialized storage, the RSM component 152 marks 612 all in-use storage as 'offline intercepted'. When a job or job step ends, RSM free frame processing will call RSM intercept processing to intercept frames in order to take them offline and not return them to the system so that they can be allocated again. After marking all the in-use storage, the RSM component 152 indicates 608 to the configuration processing that the increment could not be taken offline before ending RSM offline processing 630 and returns to processing by the configuration component 152.

All of the PFTEs within the increment are not in-use and are taken 614 offline, returning any RPA PFTEs in the increment back to the RPA queue. After taking the increment offline, the RSM component 152 indicates 616 to the configuration component 150 that the increment was taken offline. Before returning after taking the increment offline, the RSM component 152 iterates 618 through all the previously processed increments that were not taken offline because the successful offline configuration of an increment may cause another increment to now be eligible to be taken offline. For example, assume increment C was taken offline which was being backed by RPA PFTEs in increment A. This may result in increment A no longer having in-use RPA PFTEs, which in return makes increment A eligible to be taken offline.

During iteration, the RSM component 152 determines 620 for every online increment if the increment contains in-use RPA PFTEs or in-use storage. If increment contains either in-use RPA PFTEs or in-use storage it is ineligible to be taken offline, the RSM component 152 determines 624 whether there are any more increments. If the increment does not contain either in-use RPA PFTEs or in-use storage, the RSM component 152 takes 622 the increment offline, returning any RPA PFTEs in the increment back to the RPA queue. The RSM component 152 determines 624 whether there are any more increments. If there are more increments, the method 600 returns to determining 620 if the next increment in this iteration contains in-use RPA PFTEs or in-use storage. If there are no more increments, the RSM component 152 determines 626 whether there is at least one increment that was taken offline during the iteration and there are still some offline increments. If at least one increment was taken offline during this iteration, progress was made and going through all the increments again may result in some more successful offline increments and the RSM component 152 returns to iterating 618 through all the previously processed increments that were not taken offline. If there was no progress made or no more online increments, RSM offline processing 630 ends and processing returns to the configuration component 150.

Figure 7:
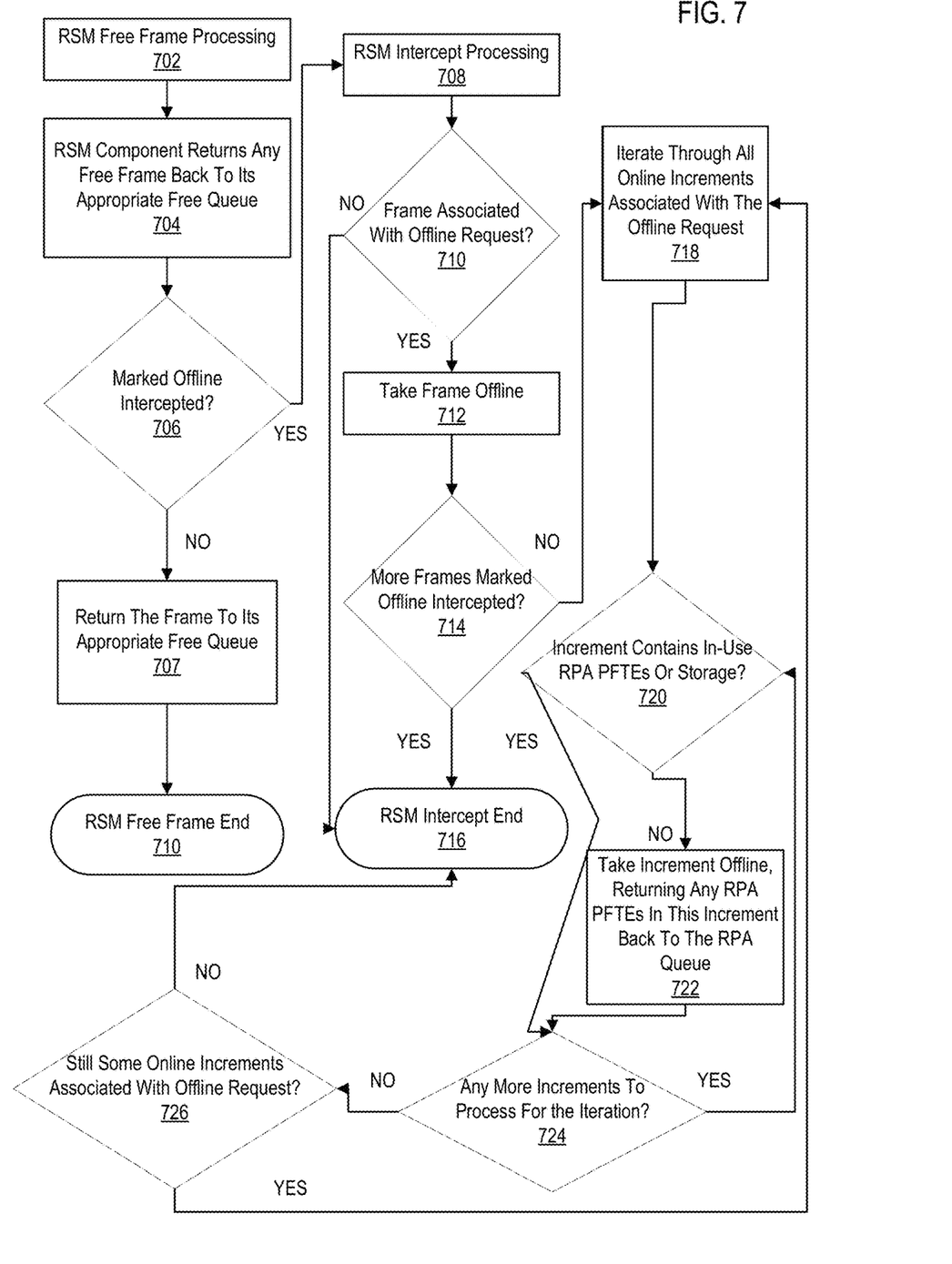
FIG. 7 is a flowchart of an example method for storage configuration intercept processing performed by the RSM component according to some embodiments of the present disclosure.

FIG. 7 is a flowchart of an example method 700 for storage configuration intercept processing performed by the RSM component 152 according to some embodiments of the present disclosure. In the method 700 of FIG. 7, RSM OFFLINE processing marks any in-use PFTEs as offline intercepted. When the storage associated with these PFTEs are freed/returned to the system, RSM free frame processing is triggered 702.

The RSM component 152 attempts to return 704 any freed frame back to its appropriate queue. Before returning the frame, the RSM component 152 checks 706 if the PFTE has been marked offline intercepted. If so, the frame should be taken offline as opposed to returned. If the PFTE has been marked offline intercepted, RSM intercept processing 708 is initiated. If the PFTE has not been marked offline intercepted, the RSM component 152 returns 707 the frame to its appropriate queue and RSM free frame processing is ended 710.

RSM intercept processing 708 assumes control from RSM free frame processing when the PFTE is marked offline intercepted. The RSM component 152 determines 710 if the intercepted PFTE is associated with the offline request. If the frame is associated with an offline request, the offline intercept frame is taken offline 712. If the frame is not associated with an offline request, RSM intercept processing is ended 716.

The RSM component 152 determines 714 if there are more PFTEs marked offline intercepted. In particular embodiments, when RSM offline processing marks PFTEs offline intercepted, it maintains a count of the number of offline intercepted PFTEs. If there are more frames marked offline intercepted, RSM intercept processing is ended 716. If there are no more frames marked offline intercepted, the RSM component 152 has taken the last offline intercepted PFTE offline. Before returning after taking the last offline intercepted PFTE offline, the RSM component 152 iterates through all the increments associated with the offline request. This is performed because the successful interception of all offline intercepted PFTEs will result in all the increments to now be eligible to be taken offline.

During iteration, the RSM component 152 checks 720 for every online increment to determine if the increment contains in-use RPA PFTEs. If the increment contains no in-use RPA PFTEs, the RSM component 152 takes 722 the increment offline as all the PFTEs within the increment are not in-use. As they are taken offline, the RPA PFTEs that back the PFTEs are returned to RPA queue.

If the increment contains in-use PFTEs or after taking 722 the increment offline, the RSM component checks 724 to see if there are any more online increments associated with this iteration to process. If there are any more online increments associated with this iteration to process, the RSM component 152 returns iterating 718 through all online increments associated with the offline request. If there are no more online increments to process, the RSM component 152 has gone through all the previously failed increments and checks if progress was made by determining 726 whether at least one increment was taken offline during this iteration. If progress was made, going through all the increments again may result in some more successful offline increments. If there are still some increments, the RSM component 152 returns to iterating 718 through all online increments associated with the offline request. If there are no more online increments, the RSM component 152 ends RSM intercept processing 716.

Figure 8:
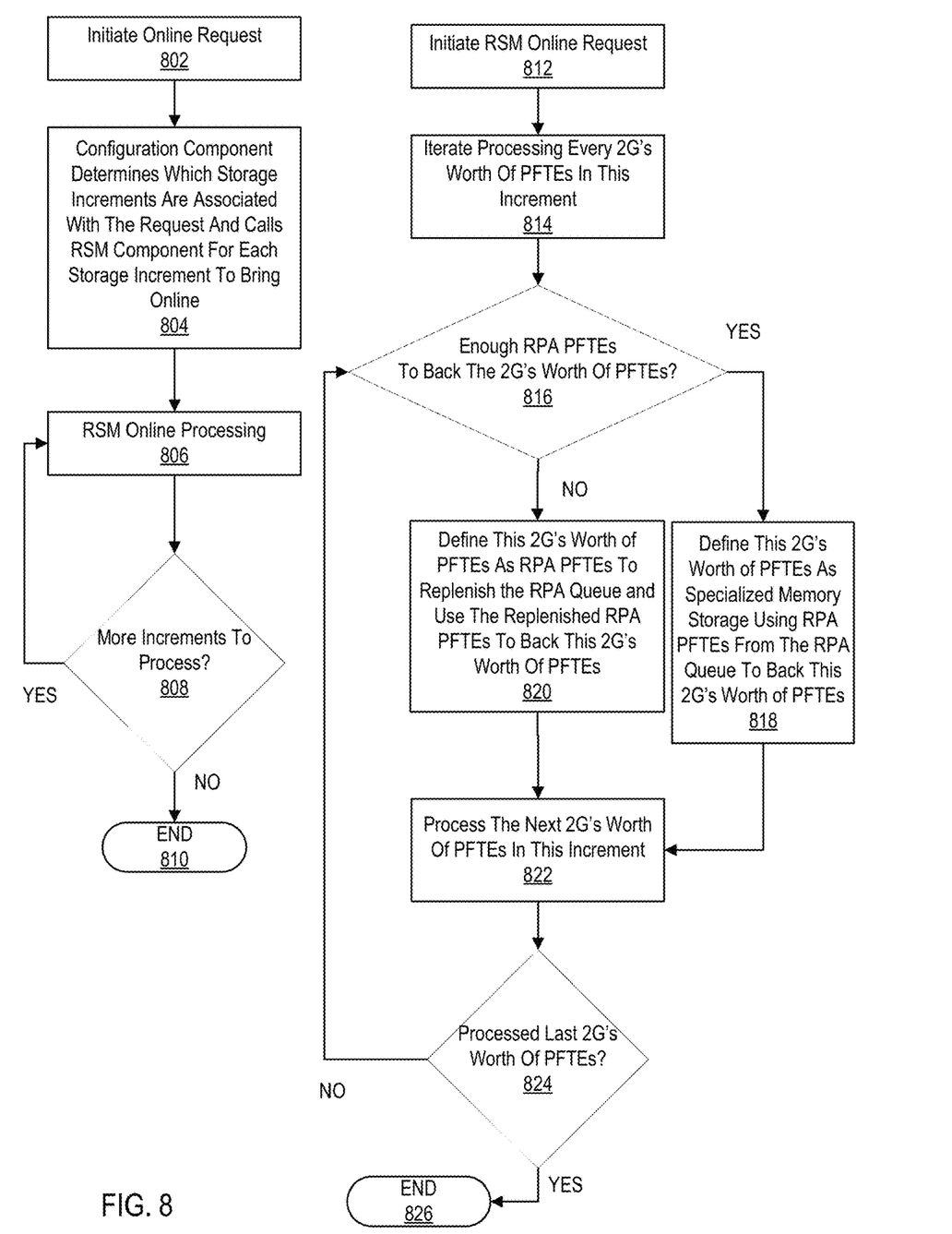
FIG. 8 is a flowchart of an example method for storage configuration online processing performed by the configuration component and the RSM component according to some embodiments of the present disclosure.

FIG. 8 is a flowchart of an example method 800 for storage configuration online processing performed by the configuration component 150 and the RSM component 152 according to some embodiments of the present disclosure. In the method 800 of FIG. 8, an online request is initiated 802 by a system command such as a CONFIG STOR ONLINE system command. The configuration component 150 determines 804 which storage increments are associated with the request and calls the RSM component 152 to perform RSM online processing 806 for each storage increment to bring online.

On return from the RSM online processing 806, configuration processing moves on to the next increment associated with the request, if any. The configuration component 150 determines 808 if there are more increments to process. If there are more increments to process, the configuration component 150 calls RSM ONLINE processing 806. If there are no more increments to process, the online request ends 810.

The configuration component 150 initiates 812 RSM online processing by calling the RSM component 152 for each increment that is to be brought online. The RSM component 152 iterates 814 processing of every 2G's worth of PFTEs in the increment. The RSM component 152 checks 816 to see if there are enough RPA PFTEs currently in the RPA queue to back this 2G's worth of PFTEs. If there are enough RPA PFTEs currently in the RPA queue, the RSM component 152 defines 818 this 2G's worth of PFTEs as specialized memory storage using RPA PFTEs from the RPA queue to back this 2G's worth of PFTEs. The RSM component 152 then moves on to process 822 the next 2G's worth of PFTEs in this increment.

If there are not enough RPA PFTEs currently in the RPA queue, the RSM component 152 defines 820 this 2G's worth of PFTEs as RPA PFTEs and the RPA queue is replenished with the newly defined RPA PFTEs. The RPA PFTEs will then be used to back this 2G's worth of PFTEs. The RSM component 152 then moves on to process 822 the next 2G's worth of PFTEs in this increment. The RSM component 152 checks 824 to see if the last 2G's worth of PFTEs in this increment has been processed. If the last 2G's worth of PFTEs in this increment has not been processed, the RSM component 152 returns to checking 816 to see if there are enough RPA PFTEs currently in the RPA queue to back this 2G's worth of PFTEs. IF the last 2G's worth of PFTEs in this increment has been processed, the RSM component 152 ends 826 RSM online processing.

Figure 9:
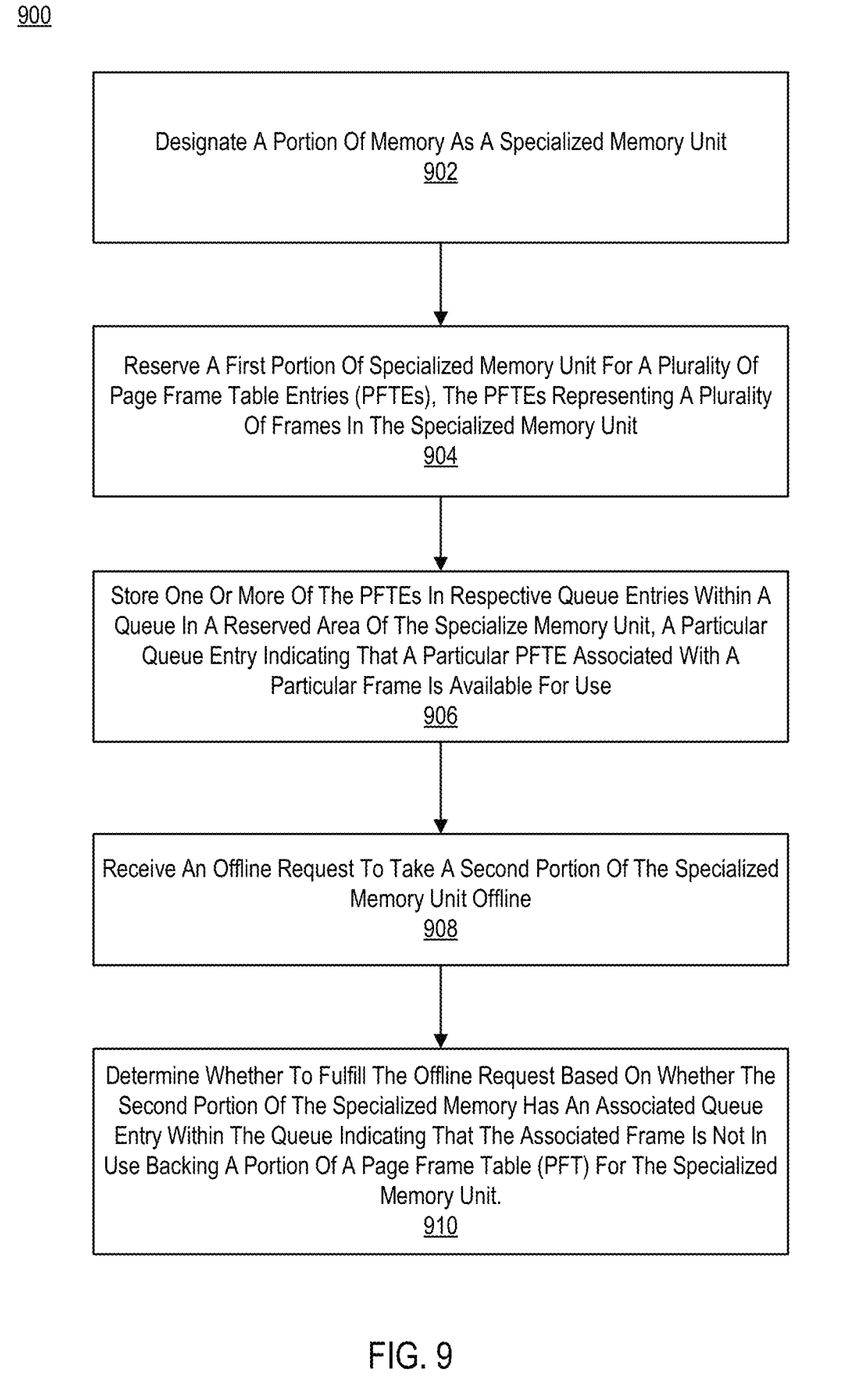
FIG. 9 is a flowchart of an example method for dynamic memory area configuration according to some embodiments of the present disclosure.

FIG. 9 is a flowchart of an example method 900 for dynamic memory area configuration according to some embodiments of the present disclosure. The method 900 includes designating 902 a portion of memory as a specialized memory unit. The method 900 includes reserving 904 a first portion of the specialized memory unit for a plurality of page frame table entries (PFTEs). The PFTEs represent a plurality of frames in the specialized memory unit. The method 900 further includes storing 906 one or more of the PFTEs in respective queue entries within a queue in a reserved area of the specialized memory unit. A particular queue entry indicates that a particular PFTE associated with a particular frame is available for use.

The method 900 further includes receiving 908 an offline request to take a second portion of the specialized memory unit offline. In some embodiments, the second portion comprises a contiguous range of the specialized memory unit that is used to represent both itself and the first portion. In some embodiments, the second portion comprises an amount of the specialized memory.

The method 900 further includes determining 910 whether to fulfill the offline request based on whether the second portion of the specialized memory unit has an associated queue entry within the queue indicating that the associated frame is not in use backing a portion of a page frame table (PFT) for the specialized memory unit.

In some embodiments, the method 900 further includes fulfilling the offline request responsive to the second portion of the specialized memory unit not having an associated queue entry within the queue. In some embodiments, the method 900 further includes storing a queue entry associated with the second portion within the queue.

In some embodiments, the method 900 further includes rejecting the offline request responsive to the second portion of the specialized memory unit having an associated queue entry within the queue. In some embodiments, the method 900 further includes prompting a user to cancel the offline request responsive to the rejecting of the offline request. In some embodiments, determining whether to fulfill the offline request is further based on whether the second portion contains an in-use PFTE.

In view of the explanations set forth above, readers will recognize that the benefits of dynamic memory area configuration for building page frame table entries according to embodiments of the present disclosure include dynamic reconfiguration of PFT space online or offline after system initialization.

Exemplary embodiments of the present disclosure are described largely in the context of a fully functional computer system for dynamic memory area configuration for building page frame table entries. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for dynamic memory area configuration, the method comprising:
   designating a portion of memory as a specialized memory unit;
   reserving a first portion of the specialized memory unit for a plurality of page frame table entries (PFTEs), the PFTEs representing a plurality of frames in the specialized memory unit;
   storing one or more of the PFTEs in respective queue entries within a queue in a reserved area of the specialized memory unit, a particular queue entry indicating that a particular PFTE associated with a particular frame is available for use;
   receiving an offline request to take a second portion of the specialized memory unit offline; and
   fulfilling the offline request responsive to a determination that the second portion of the specialized memory unit does not have an associated queue entry within the queue indicating that the associated frame is not in use backing a portion of a page frame table (PFT) for the specialized memory unit.

2. The method of claim 1, further comprising storing a queue entry associated with the second portion within the queue.

3. The method of claim 1, further comprising rejecting the offline request responsive to the second portion of the specialized memory unit having an associated queue entry within the queue.

4. The method of claim 3, further comprising prompting a user to cancel the offline request responsive to the rejecting of the offline request.

5. The method of claim 1, wherein the second portion comprises a contiguous range of the specialized memory unit that is used to represent both itself and the first portion.

6. The method of claim 1, wherein the second portion comprises an amount of the specialized memory unit.

7. The method of claim 1, wherein determining whether to fulfill the offline request is further based on whether the second portion contains an in-use PFTE.

8. An apparatus for dynamic memory area configuration, the apparatus comprising:
   a computer processor; and
   a computer memory operatively coupled to the computer processor, the computer memory having disposed within it computer program instructions that, when executed by the computer processor, cause the apparatus to:
      designate a portion of memory as a specialized memory unit;
      reserve a first portion of the specialized memory unit for a plurality of page frame table entries (PFTEs), the PFTEs representing a plurality of frames in the specialized memory unit;
      store one or more of the PFTEs in respective queue entries within a queue in a reserved area of the specialized memory unit, a particular queue entry indicating that a particular PFTE associated with a particular frame is available for use;
      receive an offline request to take a second portion of the specialized memory unit offline; and
      fulfill the offline request responsive to a determination that the second portion of the specialized memory unit does not have an associated queue entry within the queue indicating that the associated frame is not in use backing a portion of the page frame table (PFT) for the specialized memory unit.

9. The apparatus of claim 8, wherein the computer program instructions further cause the apparatus to store a queue entry associated with the second portion within the queue.

10. The apparatus of claim 8, wherein the computer program instructions further cause the apparatus to reject the offline request responsive to the second portion of the specialized memory unit having an associated queue entry within the queue.

11. The apparatus of claim 10, wherein the computer program instructions further cause the apparatus to prompt a user to cancel the offline request responsive to the rejecting of the offline request.

12. The apparatus of claim 8, wherein the second portion comprises a contiguous range of the specialized memory unit that is used to represent both itself and the first portion.

13. The apparatus of claim 8, wherein the second portion comprises an amount of the specialized memory unit.

14. The apparatus of claim 8, wherein determining whether to fulfill the offline request is further based on whether the second portion contains an in-use PFTE.

15. A computer program product for dynamic memory area configuration, the computer program product disposed upon a computer readable medium, the computer program product comprising computer program instructions that, when executed, cause a computer to:
   designate a portion of memory as a specialized memory unit;

reserve a first portion of specialized memory unit for a plurality of page frame table entries (PFTEs), the PFTEs representing a plurality of frames in the specialized memory unit;

store one or more of the PFTEs in respective queue entries within a queue in a reserved area of the specialized memory, a particular queue entry indicating that a particular PFTE associated with a particular frame is available for use;

receive an offline request to take a second portion of the specialized memory unit offline; and fulfill the offline request responsive to a determination that the second portion of the specialized memory unit does not have an associated queue entry within the queue indicating that the associated frame is not in use backing a portion of a page frame table (PFT) for the specialized memory unit.

16. The computer program product of claim 15, wherein the computer program instructions further cause the computer to store a queue entry associated with the second portion within the queue.

17. The computer program product of claim 15, wherein the computer program instructions further cause the computer to reject the offline request responsive to the second portion of the specialized memory having an associated queue entry within the queue.

\* \* \* \* \*